United States Patent
Starr

(10) Patent No.: US 11,577,770 B2
(45) Date of Patent: Feb. 14, 2023

(54) METHODS AND APPARATUS FOR A COVERING DEVICE TO INHIBIT MICROBIAL TRANSFER

(71) Applicant: Portia Starr, Scottsdale, AZ (US)

(72) Inventor: Portia Starr, Scottsdale, AZ (US)

(*) Notice: Subject to any disclaimer, the term of this patent is extended or adjusted under 35 U.S.C. 154(b) by 0 days.

(21) Appl. No.: 17/491,010

(22) Filed: Sep. 30, 2021

(65) Prior Publication Data

US 2022/0097749 A1 Mar. 31, 2022

Related U.S. Application Data

(60) Provisional application No. 63/085,447, filed on Sep. 30, 2020.

(51) Int. Cl.
*B62B 5/06* (2006.01)

(52) U.S. Cl.
CPC ..................... *B62B 5/069* (2013.01)

(58) Field of Classification Search
CPC ................... B62B 5/069; B62B 5/06
See application file for complete search history.

(56) References Cited

U.S. PATENT DOCUMENTS

| | | | |
|---|---|---|---|
| 2,981,741 A | 4/1961 | Buckwalter et al. | |
| 5,215,319 A | 6/1993 | Farris | |
| 5,427,392 A | 6/1995 | Duer | |
| 5,429,377 A * | 7/1995 | Duer | B62B 5/06 150/154 |
| 5,820,142 A | 10/1998 | Duer | |
| 6,065,764 A | 5/2000 | Moseley | |
| 6,543,794 B1 | 4/2003 | Tyree | |
| 6,817,066 B1 | 11/2004 | Williams et al. | |
| 6,981,707 B1 | 1/2006 | Dandy | |
| 7,281,718 B2 | 10/2007 | Malchow | |
| 8,714,215 B2 | 5/2014 | Badgley et al. | |
| 9,463,569 B1 * | 10/2016 | Douglas | B25G 1/102 |
| 9,676,406 B1 | 6/2017 | Kocurek et al. | |
| 10,166,158 B2 * | 1/2019 | Trinder, II | A61G 7/0507 |
| 2007/0126193 A1 | 6/2007 | Hess | |
| 2007/0267828 A1 | 11/2007 | Egizi | |
| 2008/0001371 A1 | 1/2008 | Rabiea | |
| 2011/0148056 A1 | 6/2011 | Niernberger | |
| 2016/0046313 A1 | 2/2016 | Landwehr | |
| 2016/0200341 A1 | 7/2016 | Hall | |
| 2016/0288812 A1 | 10/2016 | Bailey et al. | |
| 2020/0398883 A1 | 12/2020 | Sisson et al. | |

FOREIGN PATENT DOCUMENTS

GB 2501543 A * 10/2013 ........... A45F 5/1046

* cited by examiner

*Primary Examiner* — John D Walters
(74) *Attorney, Agent, or Firm* — Noblitt & Newson, PLLC

(57) ABSTRACT

A handle covering device for inhibiting microbial transfer according to various aspects of the present technology may comprise an elongated body having a center body section and two opposing ends. The elongated body includes an interior receiving section configured to fit around and temporarily attach to a handle of a shopping cart. The interior receiving section may include one or more surface elements configured to increase a gripping force between the handle covering device and the shopping cart handle. The center body section and the opposing ends may be configured to flexibly adjust and conform to the shopping cart handle during use.

17 Claims, 4 Drawing Sheets

METHODS AND APPARATUS FOR A COVERING DEVICE TO INHIBIT MICROBIAL TRANSFER

CROSS REFERENCES TO RELATED APPLICATIONS

This application claims the benefit of U.S. Provisional Patent Application No. 63/085,447, filed Sep. 30, 2020, and incorporates the disclosure of the application by reference.

BACKGROUND OF THE TECHNOLOGY

The University of Arizona's Environmental Research Lab found that grocery carts exhibit high numbers of HPC bacteria and coliform bacteria, indicating unsanitary conditions of the carts compared with other public places and surfaces. The research indicated that total bacterial levels are higher on shopping carts than public restrooms and other commonly touched things in these environments (airports, bus stations, public bathroom, shopping malls, etc.). Coliform bacteria and E. coli detected on the carts may have come from contact with raw foods, birds (while the carts were in the parking lot between use), other sources of animal feces, and contact with fecally contaminated hands or other body parts, such as from diaper aged infants.

SUMMARY OF THE TECHNOLOGY

A handle covering device for inhibiting microbial transfer according to various aspects of the present technology may comprise an elongated body having a center body section and two opposing ends. The elongated body includes an interior receiving section configured to fit around and temporarily attach to a handle of a shopping cart. The interior receiving section may include one or more surface elements configured to increase a gripping force between the handle covering device and the shopping cart handle. The center body section and the opposing ends may be configured to flexibly adjust and conform to the shopping cart handle during use.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional components and various steps. Such functional components may be realized by any number of components configured to perform the specified functions and achieve the various results. For example, the present technology may employ various processes, materials, sizes, configurations, elasticities, resiliencies, frictional materials, cleaning mechanisms, and exterior finishes. In addition, the technology described is merely one exemplary application for the technology.

Methods and apparatus for inhibiting microbial transfer according to various aspects of the present technology may operate in conjunction with a publicly used surface, such as a shopping cart handle. Various representative implementations of the present technology may be applied to any type of surface that may be contaminated with microbes like bacteria, viruses, and fungi, including shopping carts, gas pump handles, steering wheels, door handles, and keyboards or keypads.

For example, referring now to FIGS. 1-4, methods and apparatus for inhibiting microbial transfer according to various aspects of the present technology may comprise a handle cover 100 for a shopping cart 102. The handle cover 100 may be temporarily placed over a handle 104 of the shopping cart 102 to separate and isolate the user's hands from the handle 104 while allowing the user to use the shopping cart 102. After use, the handle cover 100 may be removed from the shopping cart 102 by the user and reused at a later time on a different shopping cart 102.

Figure 1:
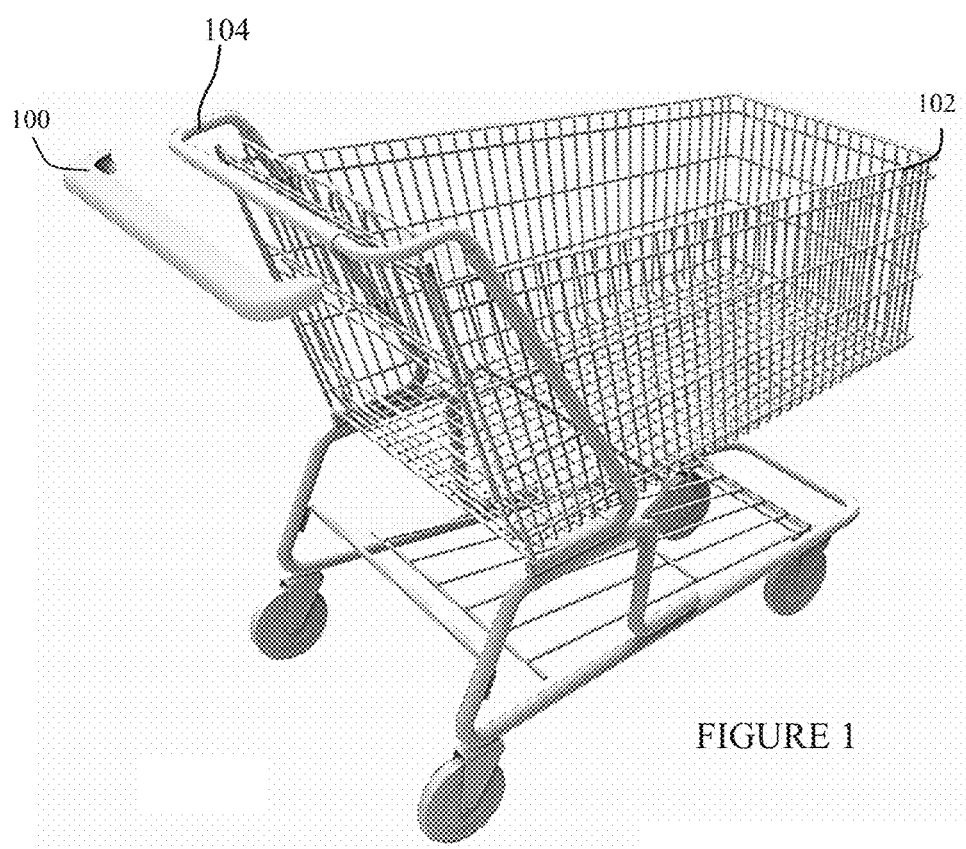
FIG. 1 representatively illustrates a rear perspective view of a handle covering device and a handle in accordance with an exemplary embodiment of the present technology.
Figure 2:
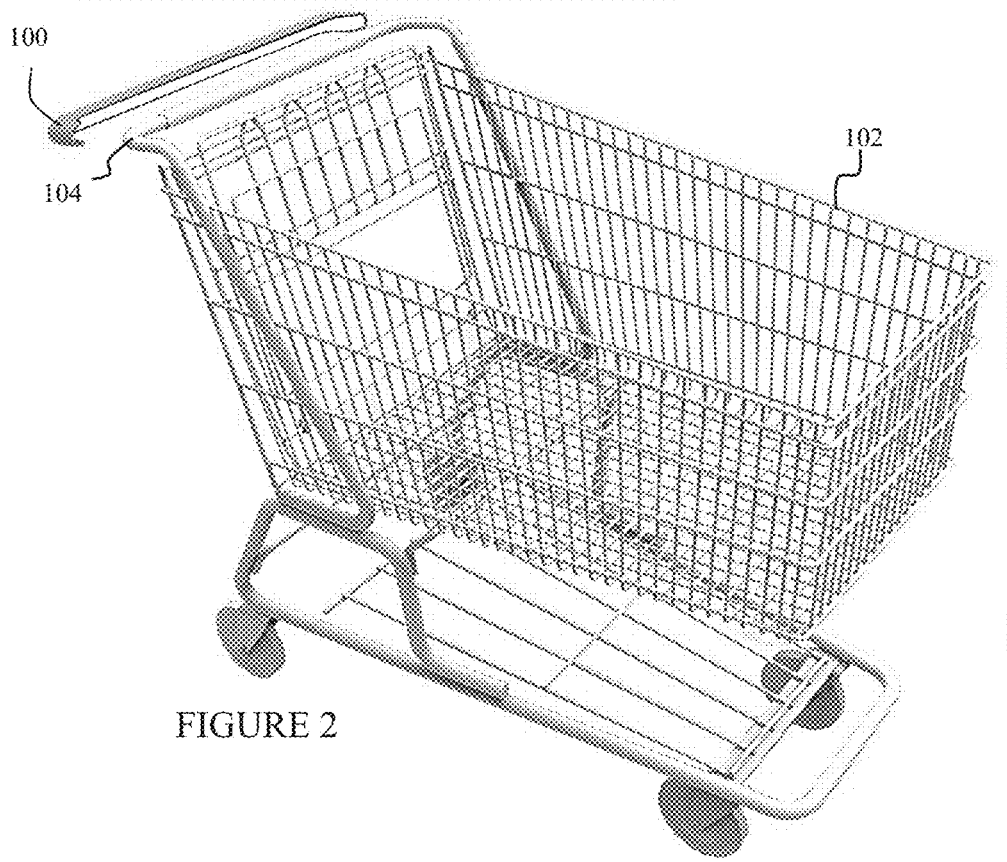
FIG. 2 representatively illustrates a front perspective view of the handle covering device and the handle in accordance with an exemplary embodiment of the present technology.
Figure 3:
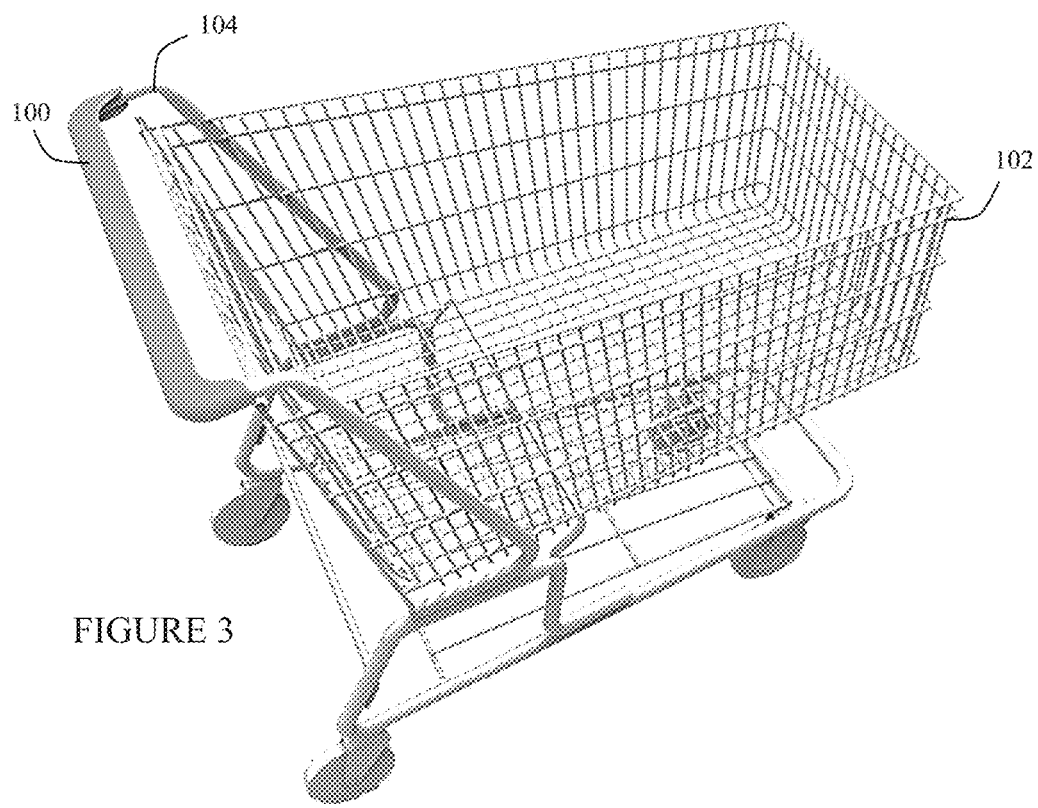
FIG. 3 representatively illustrates a perspective view of the handle covering device positioned over the handle in accordance with an exemplary embodiment of the present technology.
Figure 4:
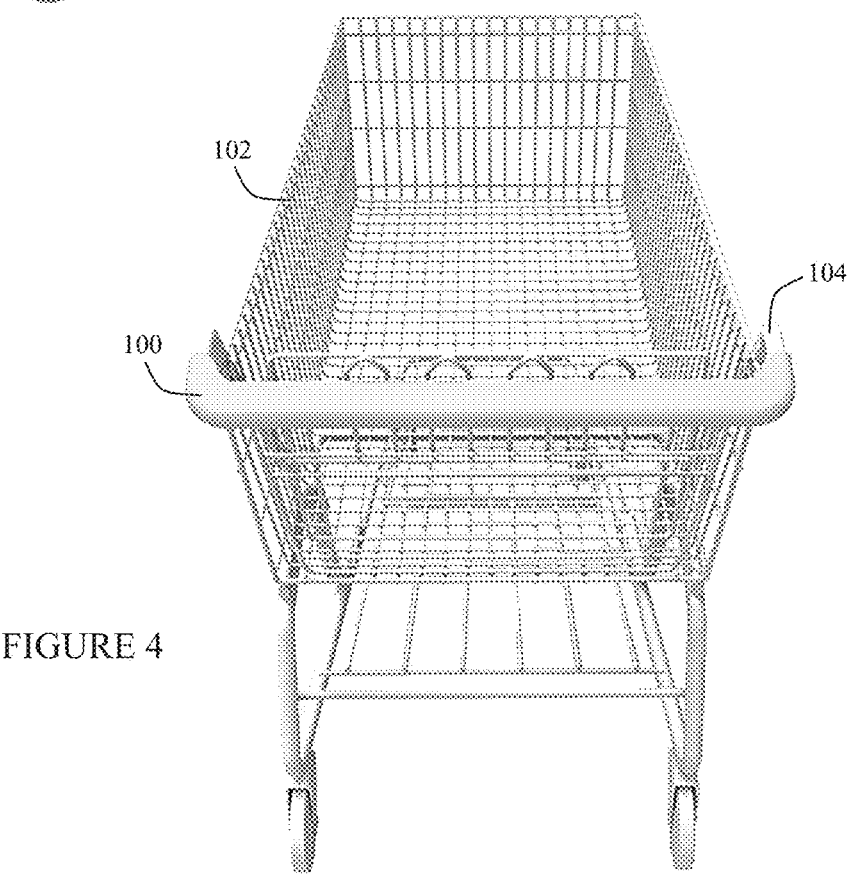
FIG. 4 representatively illustrates a rear view of the handle covering device positioned over the handle in accordance with an exemplary embodiment of the present technology.
Figure 5:
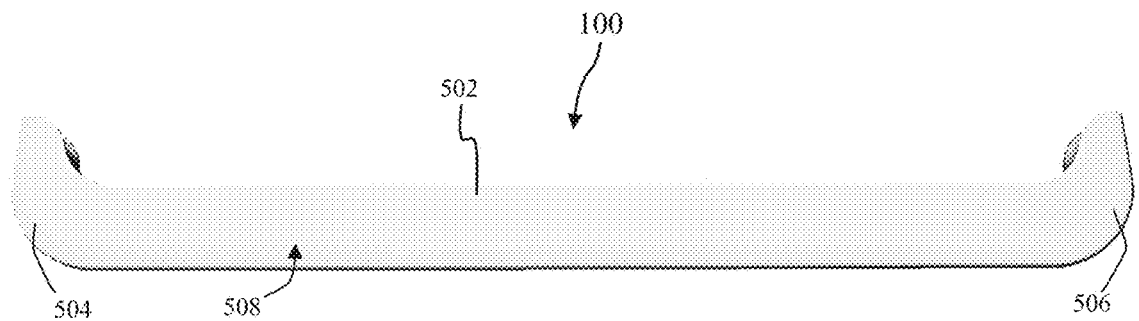
FIG. 5 representatively illustrates a top view of the handle covering device in accordance with an exemplary embodiment of the present technology.
Figure 6:
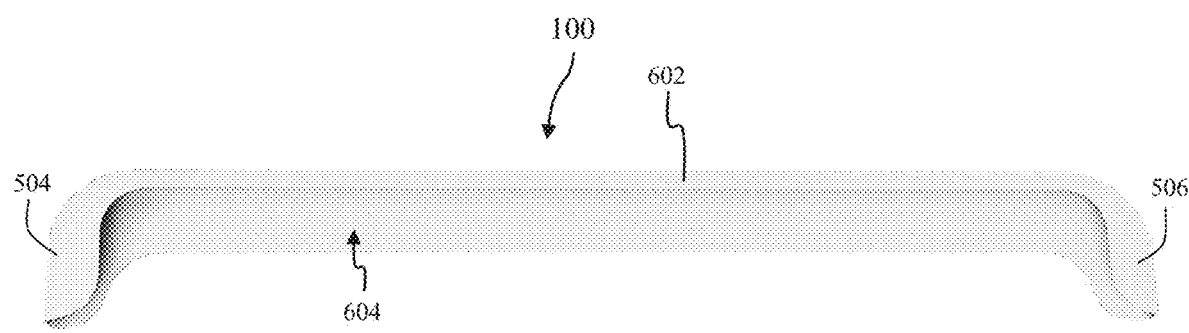
FIG. 6 representatively illustrates a bottom view of the handle covering device in accordance with an exemplary embodiment of the present technology.
Figure 7:
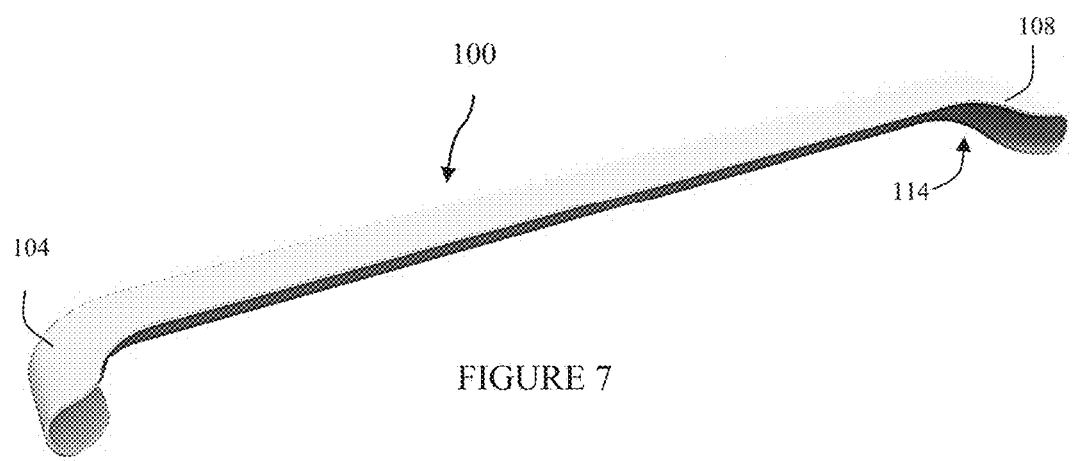
FIG. 7 representatively illustrates a forward top perspective view of the handle covering device in accordance with an exemplary embodiment of the present technology.

With reference now to FIGS. 5-7, the handle cover 100 may comprise any suitable configuration for separating and isolating the user's hands from the handle 104. In the present embodiment, the handle cover 100 may comprise an elongated body member having a center body section 502 extending between a pair of opposing perpendicular side elements 504, 506 positioned at opposite ends of the elongated body member configured to fit over and around the curved ends of the shopping cart handle 104.

The handle cover 100 may be configured to at least partially enclose the shopping cart handle 104 and reduce a likelihood of a user's fingers or thumbs coming into direct contact with the shopping cart handle 104. For example, a top surface 508 of the center body section 502 may comprise a surface configured to completely cover the top portion of the shopping cart handle 104. The top surface 508 may extend further forward than a bottom surface 602 to overhang the shopping cart handle 104 to accommodate the longer reach of the user's fingers, since the user's fingers are typically positioned above the shopping cart handle 100 and while the user's thumbs are below. In one embodiment, the top surface 508 may extend forward by a distance at least two to three times more than that of the bottom surface 602. For example, the top surface may extend forward from a rear most surface of the center body section by a distance of between about 1.5 inches (3.8 cm) and about 2.5 inches (6.4 cm) while the bottom surface 602 extends forward from the rear most surface of the center body section by a distance of between about 0.5 inches (1.3 cm) and about 1 inch (2.5 cm).

The top and bottom surfaces 508, 602 may be smooth or comprise a textured surface to increase grip between the user's hands and the handle cover 100. An interior receiving section 604 of the center body section 502 may be formed between the top and bottom surfaces 508, 602 and extend along the entire width of the handle cover 100 between the opposing perpendicular side elements 504, 506. The interior receiving section 604 is configured to contact the shopping cart handle 104 and hold the handle cover 100 in place over the shopping cart handle 104 during use. The interior receiving section 604 may comprise a size and shape configured to increase surface contact between the interior receiving section 604 and the shopping cart handle 104 to increase a holding force between the handle cover 100 and the shopping cart handle 104. For example, the interior receiving section 604 may comprise a rounded surface configured to conform to a generally tubular shaped shopping cart handle 104 creating an open gap between the top surface 508 and the bottom surface 602 of between about 1 inch (2.5 cm) and about 1.6 inches (4.1 cm) along a forward portion of the elongated body member to define an opening or access location to the interior receiving section. The interior receiving section 604 disposed along each of the opposing perpendicular side elements 504, 506 may comprise a turning radius or curve along a transition from the center body section 502 to the side elements 504, 506 to conform to the shape of the shopping cart handle 104.

The interior receiving section 604 may also comprise a surface treatment or be coated to increase a frictional engagement with the shopping cart handle 104 to inhibit slippage. The interior receiving section 604 may also be configured with one or more surface elements configured to increase a gripping force between the handle cover 100 and the shopping cart handle 104. For example, and referring now to FIG. 8, a protruding ridge element 802 may be present on the interior receiving section 604 of each of the opposing perpendicular side elements 504, 506. Each ridge element 802 may create a slightly smaller radius to the interior receiving section 604 at the location of the protrusion, wherein each lower ridge element 802 is configured to engage the shopping cart handle 104 by snapping into place around the shopping cart handle 104 when the handle cover 100 is positioned over the shopping cart handle 104. A similar upper ridge element (now shown) may be located along an underside of the top surface 508 such that the upper and lower ridge elements 802 are positioned on the same half of the tubular shaped shopping cart handle 104 when the handle cover 100 is positioned over the shopping cart handle 104.

The handle cover 100 may be provided in multiple sizes to accommodate the sizes of different shopping carts 102. For example, the handle cover 100 may comprise a width of between about 12 inches (30.4 cm) and about 30 inches (76.2 cm). Alternatively, the handle cover 100 may be configured to stretch along its width to accommodate various sizes of shopping carts 102.

The handle cover 100 may comprise any suitable material for isolating the user's hands from the shopping cart handle 104. For example, the handle cover 100 may comprise a material capable of being slightly stretched along its width to fit over the cart handle 104 to provide a snug fit. In addition, the handle cover 100 material may comprise a resilient, durable polymer based material. In one embodiment, the handle cover 100 comprises a single piece of molded silicone rubber and/or polyurethane based material that is slightly flexible and forms the entire center body section 502 and the pair of opposing perpendicular side elements 504, 506. Alternatively, in an alternative embodiment, the handle cover 100 material may comprise a more rigid body made from a stiffer plastic or other polymer based material that is still flexible enough to conform to the shopping cart handle 104 when being positioned in place. In yet another embodiment, the handle cover 100 may be formed from one or more printed materials such as polymers, thermoplastics, ceramics, and the like.

The material may also provide or be coated to provide a smooth finish on the top surface 508, for example to facilitate cleaning, such as with water and soap or other treatments. The material may also comprise a treatment, coating, or comprise materials that are selected to prevent or inhibit microbial growth. For example, in one embodiment, the handle cover 100 may comprise a material infused with silver particles configured to prevent bacterial growth on the handle cover 100 itself. Any other material having antimicrobial properties or one that is otherwise resistant to or inhibits the survival of microorganisms may be used.

Figure 8:
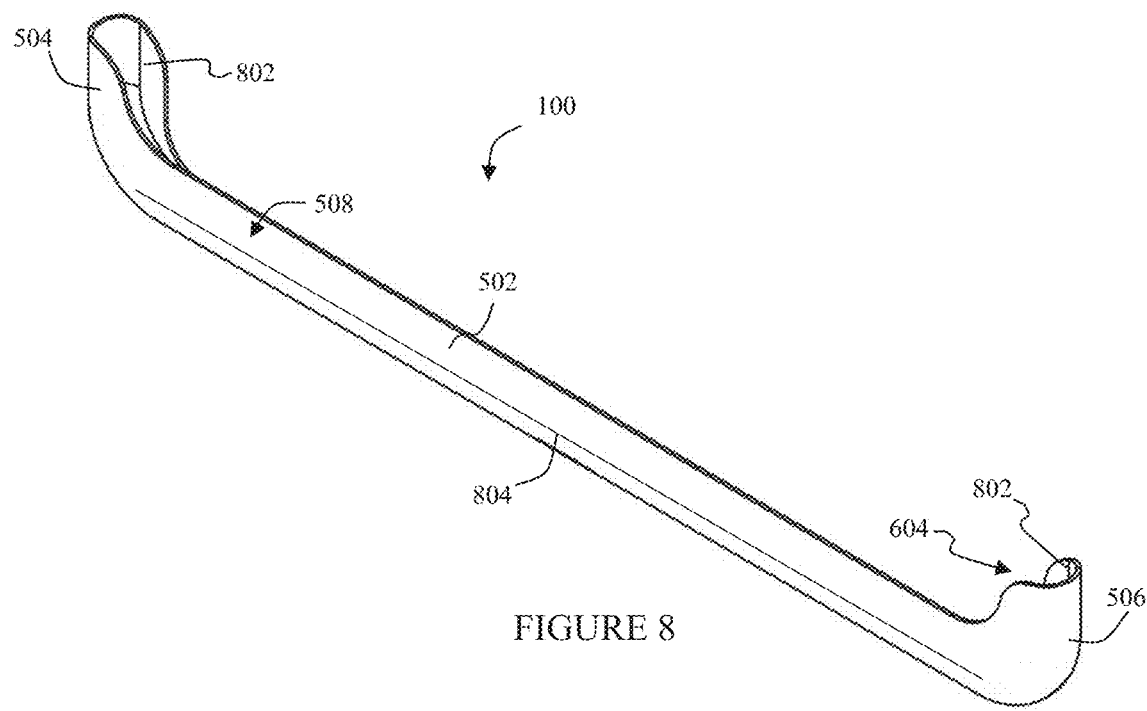
FIG. 8 representatively illustrates a ridge element on an interior surface of the handle covering device in accordance with an exemplary embodiment of the present technology.
Figure 9:
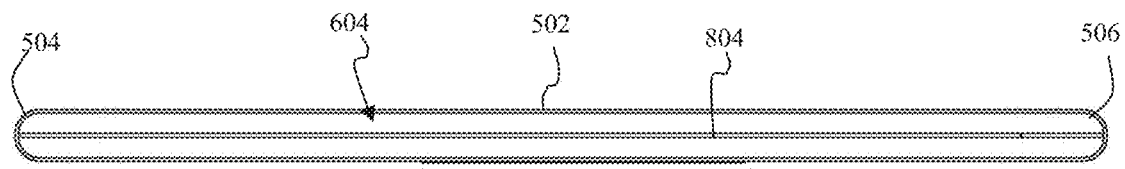
FIG. 9 representatively illustrates a bottom view of the handle covering device in accordance with an exemplary embodiment of the present technology.

Referring now to FIGS. 8 and 9, the handle cover 100 may further comprise a rib 804 of thicker material extending at least partially along the width of the handle cover 100 to provide structural support and shape to the handle cover. The rib 804 may extend along the top or bottom surfaces 508, 602 or the rib may extend along the interior receiving section 604.

The handle cover 100 may also operate in conjunction with a case (not shown), such as for storage, transport, and/or cleaning. For example, the case may isolate the handle cover 100 from the environment to keep it clean until it is ready for use. The case may also clean the handle cover 100, such as by exposing the handle cover to chemical cleaning agents or UV light, such as a UV-C light source.

In operation, the handle cover 100 may be removed from the case and slipped over the shopping cart handle 104, such as by stretching the handle cover 100 over the opposite ends of the shopping cart handle 104. The resilience of the handle cover 100 material and friction between the interior receiving section 604 of the handle cover 100 and the shopping cart handle 104 tend to maintain the handle cover 104 in position. Additional elements such as one or more ridge elements 802 located along the interior receiving section 604 may further increase a holding force between the handle cover 100 and the shopping cart handle 104. When the user completes the store visit, the user may remove the handle cover 100 from the shopping cart handle 104 and return it to the case. The case may then automatically clean the handle cover 100 or simply store the handle cover 100 so that it may be cleaned later, such as with soap and water or in a conventional dishwasher.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Although embodiments of the present technology have been described with reference to a shopping cart handle, the technology should not be viewed as being limited in that respect. As would be familiar with one of ordinary skill in the art after becoming familiar with the teachings of the present technology, the subject matter could also be used with other types of handles used with hand-held baskets, strollers, safety handles, and the like.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

The invention claimed is:

1. A handle covering device for a shopping cart handle, comprising:
   an elongated body member, comprising:
      a center body section, comprising:
         a top surface;
         a bottom surface, wherein the top surface extends further forward than the bottom surface to overhang the shopping cart handle; and
      a pair of opposing side elements positioned at opposite ends of the elongated body member, wherein the pair of opposing side elements are configured to fit over and around curved ends of the shopping cart handle to secure the handle cover in place; and
      an interior receiving section disposed between the top surface and the bottom surface and extending between the pair of opposing perpendicular side elements.

2. A handle covering device according to claim 1, wherein the interior receiving section comprises:
   a first surface element positioned at a one side element from the pair of opposing side elements; and
   a second surface element positioned at the opposing second side element.

3. A handle covering device according to claim 2, wherein the first and second surface elements each comprise a protruding ridge configured to create a slightly smaller radius to the interior receiving section at the location of the protruding ridge.

4. A handle covering device according to claim 2, wherein:
   the first surface element is disposed along an interior facing surface of the bottom surface; and
   the second surface element is disposed along the interior facing surface of the bottom surface.

5. A handle covering device according to claim 4, wherein the interior receiving section further comprises:
   a third surface element positioned an interior facing surface of the top surface opposite the first surface element; and
   a fourth surface element positioned an interior facing surface of the top surface opposite the second surface element.

6. A handle covering device according to claim 1, wherein the interior receiving section comprises a curve along a transition between the center body section and each opposing side element.

7. A handle covering device according to claim 1, further comprising a rib disposed along the interior receiving section and extending along a width of the center body section.

8. A handle covering device according to claim 1, further comprising a rib disposed along the top surface and extending along a width of the center body section.

9. A handle covering device according to claim 1, wherein the top surface and the bottom surface are separated by a gap defining an opening to the interior receiving section.

10. A handle covering device for a shopping cart handle, comprising:
    an elongated body member, comprising:
       a center body section, comprising:
          a top surface;
          a bottom surface separated from the top surface by a gap, wherein the top surface extends further forward than the bottom surface to overhang the shopping cart handle; and
       a pair of opposing perpendicular side elements positioned at opposite ends of the elongated body member, wherein the pair of opposing perpendicular side elements are configured to fit over and around curved ends of the shopping cart handle to secure the handle cover in place; and
       an interior receiving section configured to receive a center section of the shopping cart handle, wherein the interior receiving section:
          is disposed between the top surface and the bottom surface;
          extends between the pair of opposing perpendicular side elements; and
          is accessible through the gap.

11. A handle covering device according to claim 10, wherein the interior receiving section comprises:

a first surface element positioned at a one side element from the pair of opposing perpendicular side elements; and a second surface element positioned at the opposing second perpendicular side element.

12. A handle covering device according to claim 11, wherein the first and second surface elements each comprise a protruding ridge configured to create a slightly smaller radius to the interior receiving section at the location of the protruding ridge.

13. A handle covering device according to claim 11, wherein:

the first surface element is disposed along an interior facing surface of the bottom surface; and the second surface element is disposed along the interior facing surface of the bottom surface.

14. A handle covering device according to claim 13, wherein the interior receiving section further comprises:

a third surface element positioned an interior facing surface of the top surface opposite the first surface element; and a fourth surface element positioned an interior facing surface of the top surface opposite the second surface element.

15. A handle covering device according to claim 10, wherein the interior receiving section comprises a curve along a transition between the center body section and each opposing perpendicular side element.

16. A handle covering device according to claim 10, further comprising a rib disposed along the interior receiving section and extending along a width of the center body section.

17. A handle covering device according to claim 10, further comprising a rib disposed along the top surface and extending along a width of the center body section.

* * * * *